United States Patent
Cook, III

(10) Patent No.: US 10,933,489 B2
(45) Date of Patent: Mar. 2, 2021

(54) TRANSIENT LIQUID PHASE BONDING OF SURFACE COATINGS METAL-COVERED MATERIALS

(71) Applicant: United Technologies Corporation, Farmington, CT (US)

(72) Inventor: Grant O. Cook, III, Spring, TX (US)

(73) Assignee: RAYTHEON TECHNOLOGIES CORPORATION, Waltham, MA (US)

(*) Notice: Subject to any disclaimer, the term of this patent is extended or adjusted under 35 U.S.C. 154(b) by 1104 days.

(21) Appl. No.: 14/903,844

(22) PCT Filed: Jul. 9, 2014

(86) PCT No.: PCT/US2014/045936
§ 371 (c)(1),
(2) Date: Jan. 8, 2016

(87) PCT Pub. No.: WO2015/006439
PCT Pub. Date: Jan. 15, 2015

(65) Prior Publication Data
US 2016/0151856 A1    Jun. 2, 2016

Related U.S. Application Data

(60) Provisional application No. 61/844,032, filed on Jul. 9, 2013, provisional application No. 61/844,118, filed on Jul. 9, 2013.

(51) Int. Cl.
*B23K 35/00*    (2006.01)
*B23K 20/16*    (2006.01)
(Continued)

(52) U.S. Cl.
CPC .............. *B23K 20/16* (2013.01); *B23K 20/02* (2013.01); *B23K 20/233* (2013.01);
(Continued)

(58) Field of Classification Search
None
See application file for complete search history.

(56) References Cited

U.S. PATENT DOCUMENTS 3,678,570 A * 7/1972 Paulonis ............... B23K 20/16
                                                    228/194
5,234,152 A * 8/1993 Glaeser ............... B23K 20/023
                                                    228/121
(Continued)

FOREIGN PATENT DOCUMENTS

EP    0145785 B1    7/1989
EP    2047937 A2    4/2009
(Continued)

OTHER PUBLICATIONS

European Search Report for European Application No. 14823037.8, dated May 15, 2017, 11 pages.
(Continued)

*Primary Examiner* — Erin B Saad
(74) *Attorney, Agent, or Firm* — Cantor Colburn LLP

(57) ABSTRACT

A method for bonding components is disclosed. The method may comprise positioning an interlayer between a metallic component and a metal-plated non-metallic component at a bond region, heating the bond region to a bonding temperature to produce a liquid at the bond region, and maintaining the bond region at the bonding temperature until the liquid has solidified to form a bond between the metallic component and the metal-plated non-metallic component at the bond region. A method for providing a part having a customized coating is also disclosed. The method may comprise applying a metallic coating on a surface of a metallic substrate, and bonding the metallic coating to the metallic substrate by a transient liquid phase bonding process to provide the part having the customized coating.

10 Claims, 9 Drawing Sheets

(51) Int. Cl.
*B23K 20/02* (2006.01)
*B23K 35/36* (2006.01)
*B32B 15/01* (2006.01)
*B23K 20/233* (2006.01)
*B23K 103/16* (2006.01)
*B23K 101/00* (2006.01)
*B23K 103/00* (2006.01)
*B23K 101/34* (2006.01)
*B23K 103/18* (2006.01)

(52) U.S. Cl.
CPC ...... *B23K 35/3612* (2013.01); *B23K 35/3613* (2013.01); *B32B 15/01* (2013.01); *B23K 2101/001* (2018.08); *B23K 2101/34* (2018.08); *B23K 2103/16* (2018.08); *B23K 2103/172* (2018.08); *B23K 2103/18* (2018.08); *B23K 2103/26* (2018.08); *B23K 2103/42* (2018.08)

(56) References Cited

U.S. PATENT DOCUMENTS

| | | | |
|---|---|---|---|
| 5,372,298 | A | 12/1994 | Glaeser |
| 6,060,174 | A * | 5/2000 | Sabol ................. C23C 4/18 416/241 R |
| 7,354,354 | B2 * | 4/2008 | Palumbo ............. A01K 87/00 473/320 |
| 8,247,050 | B2 | 8/2012 | McCrea et al. |
| 8,394,473 | B2 | 3/2013 | McCrea et al. |
| 8,602,290 | B2 | 12/2013 | Hippensteel et al. |
| 8,608,049 | B2 | 12/2013 | Hippensteel et al. |
| 2003/0141345 | A1 | 7/2003 | Shinkai et al. |
| 2004/0131835 | A1 * | 7/2004 | Schmitt ........... H01L 23/3733 428/293.1 |
| 2005/0006784 | A1 * | 1/2005 | Nakayama .......... H01L 23/3114 257/777 |
| 2007/0152026 | A1 | 7/2007 | McCrea et al. |
| 2008/0035707 | A1 | 2/2008 | Glaeser |
| 2009/0098310 | A1 | 4/2009 | Hippensteel et al. |
| 2010/3004063 | | 12/2010 | McCrea et al. |
| 2011/0090665 | A1 * | 4/2011 | Korony ................ H01C 1/148 361/821 |
| 2011/0220704 | A1 * | 9/2011 | Liu .................... B23K 35/0238 228/252 |
| 2011/0230973 | A1 | 9/2011 | Hippensteel et al. |
| 2011/0233263 | A1 | 9/2011 | Hippensteel et al. |
| 2012/0082541 | A1 | 4/2012 | Macchia et al. |
| 2012/0306105 | A1 * | 12/2012 | Robert ............... H01L 23/3735 257/783 |
| 2012/0321906 | A1 | 12/2012 | McCrea et al. |
| 2013/0143058 | A1 | 6/2013 | McCrea et al. |
| 2014/0069990 | A1 | 3/2014 | Hippensteel et al. |

FOREIGN PATENT DOCUMENTS

| | | |
|---|---|---|
| WO | 1995004627 A1 | 2/1995 |
| WO | 02062519 A1 | 8/2002 |

OTHER PUBLICATIONS

Grant O. Cook III et al, "Overview of transient liquid phase and partial transient liquid phase bonding", Journal of Materials Science, vol. 46, No. 16, May 2011, 19 pages.

International Search Report for International Application No. PCT/US2014045936.

Written Opinion for International Application No. PCT/US2014045936.

* cited by examiner

TRANSIENT LIQUID PHASE BONDING OF SURFACE COATINGS METAL-COVERED MATERIALS

CROSS-REFERENCE TO RELATED APPLICATIONS

This application claims priority under 35 U.S.C. § 119(e) to U.S. Provisional Patent Application Ser. No. 61/844,118 filed on Jul. 9, 2013 and to U.S. Provisional Patent Application Ser. No. 61/844,032 filed on Jul. 9, 2013.

FIELD OF DISCLOSURE

The present disclosure generally relates to methods for joining metal-coated materials, and to methods for producing customized metallic coatings. More specifically, this disclosure relates to the use of transient liquid phase (TLP) for joining metal-coated materials and for the production of customized metallic coatings on metallic substrates.

BACKGROUND

Technological advances in metal-covered non-metallic materials such as metal-plated polymers and metal-plated composites (collectively referred to herein as "plated polymers") provide for their use in gas turbine engines. Plated polymers can be substituted for gas turbine engine components previously composed of metals, alloys and traditional composites.

However, due to the presence of polymers and/or composite materials, plated-polymer components cannot be joined to other metal components by many conventional methods. Polymers tend to flow or outgas at relatively low temperatures. Thus, welding and brazing, techniques commonly used for joining two metal components, require temperatures that can cause deformation or destruction of the polymer or composite substrate of a plated polymer component. As a result, few methods can be used to join plated polymer components to themselves or to other metal structures. Hardware and assembly devices such as bolts and rivets can be used, but these forms of fastening have disadvantages and limitations. Clearly, there is a need for improved methods for joining plated polymer components to other metal components, including metal-covered components.

In addition, many metallic structures employed in industries such as, but not limited to, aerospace and automotive industries may derive substantial beneficial properties from the application of metallic coatings to their surfaces. Modifications of the exterior surfaces of metallic structures with metallic coatings may occur without altering the interior of the metallic structures. Depending on the industrial use of the metallic structure, metallic coatings may be selected based on their ability to impart the surfaces of the metallic structure with one or more desired properties such as, but not limited to, enhanced hardness, wear resistance, oxidation resistance, or conductivity. Although conventional coating application methods, such as cold spraying, may provide a metallic interlock between the metallic substrate and the coating, in some cases it may be desirable to form a more robust and thermally stable bond between the metallic substrate and the coating. Furthermore, current metallic coating application methods typically do not provide surface coatings which have a blend of the microstructural and physical properties of both the metallic substrate and the metallic coating(s). In this regard, methods which allow an engineer to select and combine metallic coatings to provide customized coatings having a mixture of desired properties are wanting. Clearly, there is also a need for methods which provide more thermally stable bonds between metallic substrates and the metallic coating(s) and which result in a customized surface coating having a mixture of the properties of the metallic substrate and the metallic coating(s).

SUMMARY

In accordance with one aspect of the present disclosure, a method of bonding components is disclosed. The method can include positioning an interlayer between a first metallic component and a metal-plated non-metallic component at a bond region, heating the bond region to a bonding temperature to produce a liquid at the bond region, and maintaining the bond region at the bonding temperature until the liquid produced at the bond region has solidified to form a bond between the first metallic component and the metal-plated non-metallic component at the bond region. The interlayer can include an element selected from the group consisting of gallium, indium, selenium, tin, bismuth, iodine, polonium, cadmium, and combinations thereof.

The method of the preceding paragraph can optionally include, additionally and/or alternatively, any one or more of the following features, configurations and/or additional components:

A further embodiment of the foregoing method can further include homogenizing the bond.

A further embodiment of any of the foregoing methods can further include homogenizing the bond at a temperature substantially equivalent to the bonding temperature.

A further embodiment of any of the foregoing methods can further include homogenizing the bond at a temperature lower than the bonding temperature.

A further embodiment of any of the foregoing methods can further include that the first metallic component is selected from the group consisting of metal-plated polymers and metal-plated composites.

A further embodiment of any of the foregoing methods can further include that one of the first metallic component and the metal-plated non-metallic component are selected from the group consisting of ribs, bosses, flanges, channels, clamps, covers, ducts and brackets.

A further embodiment of any of the foregoing methods can further include that the interlayer has a thickness between about 0.00127 mm (0.00005 inches) and about 1.27 mm (0.050 inches).

A further embodiment of any of the foregoing methods can further include that the interlayer has at least 50% by weight of an element selected from the group consisting of gallium, indium, selenium, tin, bismuth, iodine, polonium, cadmium, and combinations thereof.

A further embodiment of any of the foregoing methods can further include an interlayer having a first layer with a first thickness, a second layer adjacent the first layer with a second thickness greater than the first, and a third layer adjacent the second layer on a side generally opposite the first layer.

A further embodiment of any of the foregoing methods can further include that the first layer has an element selected from the group consisting of gallium, indium, selenium, tin, bismuth, iodine, polonium, cadmium, and combinations thereof.

A further embodiment of any of the foregoing methods can further include that the second layer has an element selected from the group consisting of refractory metals nickel, iron, cobalt, gold, magnesium, silver, copper, antimony, manganese, palladium, strontium, tellurium, ytterbium, aluminum, calcium, europium, gadolinium, germanium, platinum, rhodium, thulium, vanadium, and combinations thereof.

A further embodiment of any of the foregoing methods can further include that the third layer has an element selected from the group consisting of gallium, indium, selenium, tin, bismuth, iodine, polonium, cadmium, and combinations thereof.

A further embodiment of any of the foregoing methods can further include that the second thickness is between about 0.00254 mm (0.0001 inches) and about 1.27 mm (0.050 inches).

A further embodiment of any of the foregoing methods can further include that the first thickness is between about 0.2% and about 20% of the second thickness.

A further embodiment of any of the foregoing methods can further include that the metal-plated non-metallic component is a metal-plated polymer having a polymer component having a polymer selected from the group consisting of polyphenylene sulfides, polyamides, polyvinylchloride (PVC), polystyrene (PS), polyethylene (PE), polypropylene (PP), styrene-acrylonitrile (SAN), polycarbonate (PC), acrylonitrile styrene acrylate (ASA), acrylonitrile butadiene styrene (ABS), ethylene tetrafluoroethylene fluoropolymer (ETFE), high impact polystyrene (HIPS), polyamide (PA), polybutylene terephthalate (PBT), polyetherimide (PEI), perchloroethylene (PCE), polyether sulfone (PES), polyethylene terephthalate (PET), polysulfone (PSU), polyurethane (PUR), polyvinylidene fluoride (PVDF), polyether ether ketone (PEEK), polyetherimide (PEI), thermoplastic polyimide, condensation polyimide, addition polyimide, polyether ketone ketone (PEKK), polysulfone, polyphenylsulfide, polyester, epoxy cured with aliphatic and/or aromatic amines and/or anhydrides, cyanate esters, phenolics, polyacrylates, polymethacrylates, silicones (thermoset), and combinations thereof; and a metallic layer covering at least a portion of the polymer component such that the metallic layer is located at the bond region of the second component.

A further embodiment of any of the foregoing methods can further include that the metallic layer has an element selected from the group consisting of nickel, cobalt, iron, gold, silver, copper, alloys of nickel, cobalt, iron, gold, silver, and copper, and combinations thereof.

A further embodiment of any of the foregoing methods can further include that the metallic layer has a thickness between about 0.127 mm (0.005 inches) and about 2.54 mm (0.100 inches).

A further embodiment of any of the foregoing methods can further include that the polymer component has an average thickness between about 1.27 mm (0.050 inches) and about 12.7 mm (0.500 inches).

A further embodiment of any of the foregoing methods can further include that the metal-plated non-metallic component is a metal-plated composite having a composite component with an average thickness between about 1.27 mm (0.050 inches) and about 12.7 mm (0.500 inches) and a metallic layer covering at least a portion of the composite component such that the metallic layer is located at the bond region of the second component.

A further embodiment of any of the foregoing methods can further include that the metallic layer has a thickness between about 0.127 mm (0.005 inches) and about 2.54 mm (0.100 inches).

A further embodiment of any of the foregoing methods can further include that the metal-plated non-metallic component is a metal-plated composite having a composite component; and a metallic layer covering at least a portion of the composite component such that the metallic layer is located at the bond region of the second component.

In accordance with another aspect of the present disclosure, a bonded component is disclosed. The bonded component can include one of a polymer component or a composite component, a first metal layer covering the polymer component or composite component, a second metal layer, and a solidified layer located between the first and second metal layers that bonds the first metal layer to the second metal layer. The solidified layer can include an element selected from the group consisting of gallium, indium, selenium, tin, bismuth, iodine, polonium, cadmium, and combinations thereof.

The bonded component of the preceding paragraph can optionally include, additionally and/or alternatively, any one or more of the following features, configurations and/or additional components:

A further embodiment of the foregoing bonded component can further include that the polymer component comprises a polymer selected from the group consisting of polyphenylene sulfides, polyamides, polyvinylchloride (PVC), polystyrene (PS), polyethylene (PE), polypropylene (PP), styrene-acrylonitrile (SAN), polycarbonate (PC), acrylonitrile styrene acrylate (ASA), acrylonitrile butadiene styrene (ABS), ethylene tetrafluoroethylene fluoropolymer (ETFE), high impact polystyrene (HIPS), polyamide (PA), polybutylene terephthalate (PBT), polyetherimide (PEI), perchloroethylene (PCE), polyether sulfone (PES), polyethylene terephthalate (PET), polysulfone (PSU), polyurethane (PUR), polyvinylidene fluoride (PVDF), polyether ether ketone (PEEK), polyetherimide (PEI), thermoplastic polyimide, condensation polyimide, addition polyimide, polyether ketone ketone (PEKK), polysulfone, polyphenylsulfide, polyester, epoxy cured with aliphatic and/or aromatic amines and/or anhydrides, cyanate esters, phenolics, polyacrylates, polymethacrylates, silicones (thermoset), and combinations thereof.

A further embodiment of any of the foregoing bonded components can further include that the second metal layer covers a second polymer component or composite component.

A further embodiment of any of the foregoing bonded components can further include that the solidified layer further has an element selected from the group consisting of refractory metals, nickel, iron, cobalt, gold, magnesium, silver, copper, antimony, manganese, palladium, strontium, tellurium, ytterbium, aluminum, calcium, europium, gadolinium, germanium, platinum, rhodium, thulium, vanadium, and combinations thereof.

A further embodiment of any of the foregoing bonded components can further include that the polymer component or composite component has an average thickness between about 1.27 mm (0.050 inches) and about 12.7 mm (0.500 inches), and wherein the first metal layer has a thickness between about 0.127 mm (0.005 inches) and about 2.54 mm (0.100 inches).

In accordance with another aspect of the present disclosure, a bonded component can include a first polymer or composite component, a first metal layer covering the first polymer or composite component, a second polymer or composite component, a second metal layer covering the second polymer or composite component, and a solidified layer located between the first and second metal layers that bonds the first metal layer to the second metal layer, the solidified layer comprising an element selected from the group consisting of gallium, indium, selenium, tin, bismuth, iodine, polonium, cadmium, and combinations thereof.

The bonded component of the preceding paragraph can optionally include, additionally and/or alternatively, any one or more of the following features, configurations and/or additional components:

A further embodiment of the foregoing bonded component can further include that the solidified layer further contains an element selected from the group consisting of refractory metals, nickel, iron, cobalt, gold, magnesium, silver, copper, antimony, manganese, palladium, strontium, tellurium, ytterbium, aluminum, calcium, europium, gadolinium, germanium, platinum, rhodium, thulium, vanadium, and combinations thereof.

A further embodiment of any of the foregoing bonded components can further include that the first and second polymer or composite components have a material selected from the group consisting of polyphenylene sulfides, polyamides, polyvinylchloride (PVC), polystyrene (PS), polyethylene (PE), polypropylene (PP), styrene-acrylonitrile (SAN), polycarbonate (PC), acrylonitrile styrene acrylate (ASA), acrylonitrile butadiene styrene (ABS), ethylene tetrafluoroethylene fluoropolymer (ETFE), high impact polystyrene (HIPS), polyamide (PA), polybutylene terephthalate (PBT), polyetherimide (PEI), perchloroethylene (PCE), polyether sulfone (PES), polyethylene terephthalate (PET), polysulfone (PSU), polyurethane (PUR), polyvinylidene fluoride (PVDF), polyether ether ketone (PEEK), polyetherimide (PEI), thermoplastic polyimide, condensation polyimide, addition polyimide, polyether ketone ketone (PEKK), polysulfone, polyphenylsulfide, polyester, epoxy cured with aliphatic and/or aromatic amines and/or anhydrides, cyanate esters, phenolics, polyacrylates, polymethacrylates, silicones (thermoset), and combinations thereof.

In accordance with another aspect of the present disclosure, a method for providing a part having a customized coating is disclosed. The method may comprise applying a metallic coating on a surface of a metallic substrate to provide a coated substrate, and bonding the metallic coating to the substrate by a transient liquid phase bonding process to provide the part having the customized coating.

In another refinement, the customized coating may have a set of properties different than those of the metallic substrate and the metallic coating.

In another refinement, the transient liquid phase bonding process may comprise progressively heating the coated substrate to a bonding temperature.

In another refinement, progressively heating the coated substrate to the bonding temperature may cause at least a portion of the metallic coating to melt and form a liquid interlayer, the liquid interlayer to expand in thickness and dissolve a portion of a material forming the metallic substrate, and the liquid interlayer to undergo an isothermal solidification process.

In another refinement, the bond between the customized coating and the metallic substrate may have a melting temperature that exceeds the bonding temperature.

In another refinement, heating the coated substrate to the first temperature may cause the metallic coating to melt by direct melting.

In another refinement, heating the coated substrate to the first temperature may cause a portion of the metallic coating to melt by eutectic melting, and the liquid interlayer may be formed between the metallic substrate and an un-melted portion of the metallic coating.

In another refinement, the method may further comprise heating the part past the bonding temperature to increase a fraction of the material forming the metallic substrate in the customized coating.

In accordance with another aspect of the present disclosure, a method for providing a part having a customized coating is disclosed. The method may comprise: 1) applying a first metallic coating on a surface of a metallic substrate, 2) applying a second metallic coating on the first metallic coating to provide a coated substrate, and 3) bonding the first metallic coating and the second metallic coating to the metallic substrate by a transient liquid phase bonding process to provide the part having the customized coating.

In another refinement, the first metallic coating and the second metallic coating may each have a thickness ranging from less than about 0.001 millimeters up to about 0.5 millimeters.

In another refinement, the transient liquid phase bonding process may comprise progressively heating the coated substrate to a bonding temperature.

In another refinement, progressively heating the coated substrate to the bonding temperature may comprise: 1) heating the coated substrate to a first temperature that is lower than the bonding temperature to cause at least a portion of at least one of the first metallic coating and the second metallic coating to melt and form at least one liquid interlayer, 2) heating the coated substrate past the first temperature to cause the at least one liquid interlayer to expand in thickness, and 3) heating the coated substrate to the bonding temperature to cause the at least one liquid interlayer to undergo an isothermal solidification process.

In another refinement, a bond between the customized coating and the metallic substrate may have a melting temperature that exceeds the bonding temperature.

In another refinement, heating the coated substrate to the first temperature may cause the first metallic coating to melt by direct melting.

In another refinement, heating the coated substrate to the first temperature may cause a portion of the second metallic coating to melt by eutectic melting, and the at least one liquid interlayer may be formed between an un-melted portion of the first metallic coating an un-melted portion of the second metallic coating.

In another refinement, the method may further comprise heating the part past the bonding temperature to increase a fraction of a material forming the metallic substrate in the customized coating.

In accordance with another aspect of the present invention, a metallic part having a customized metallic coating is disclosed. The metallic part may be formed by a method comprising applying one or more metallic coatings to a surface of a metallic substrate to provide a coated substrate, and bonding the one or more metallic coatings to the metallic substrate by a transient liquid phase bonding process. The transient liquid phase bonding process may comprise progressively heating the coated substrate to a bonding temperature to cause: 1) at least a portion of the at least one metallic coating to melt and form a liquid interlayer, 2) the liquid interlayer to expand in thickness, and 3) the liquid interlayer to undergo an isothermal solidification process and provide the part with the customized coating.

In another refinement, a bond between the customized metallic coating and the metallic substrate may have a melting temperature that exceeds the bonding temperature.

These and other aspects and features of the present disclosure will be more readily understood when read in conjunction with the accompanying drawings.

It should be understood that the drawings are not necessarily drawn to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments disclosed herein.

DETAILED DESCRIPTION

Transient Liquid Phase Bonding of Metal-Covered Materials

The term "plated polymer" as used herein refers to a metal-covered non-metallic material, including, but not limited to, polymers having a metal covering formed by electroplating, electroless plating, electroforming, spray coating, physical vapor deposition, and other metal deposition methods and composite materials having a metal covering formed by electroplating, electroless plating, electroforming, spray coating, physical vapor deposition, and other metal deposition methods. "Composite materials" include, but are not limited to, carbon- or glass-fiber-reinforced polymers (thermoplastics and thermosets).

Transient liquid phase (TLP) bonding is a bonding process that joins materials using an interlayer. On heating, the interlayer melts and the interlayer element diffuses into the substrate materials, causing isothermal solidification. The result of this process is a bond that has a higher melting point than the bonding temperature (i.e. the temperature at which the interlayer is melted and isothermally solidifies). According to embodiments of the present invention, TLP bonding is used to join a plated polymer component with a metal component. TLP bonding allows plated polymer components to be joined with metal components without the use of the aforementioned destructive welding or brazing and without the physical limitations presented by bolts, rivets and other mechanical joining methods. TLP bonding of plated polymer components can also eliminate weak or thin areas in the plating formed as a result of pitting or recesses formed during the plating process.

Figure 1:
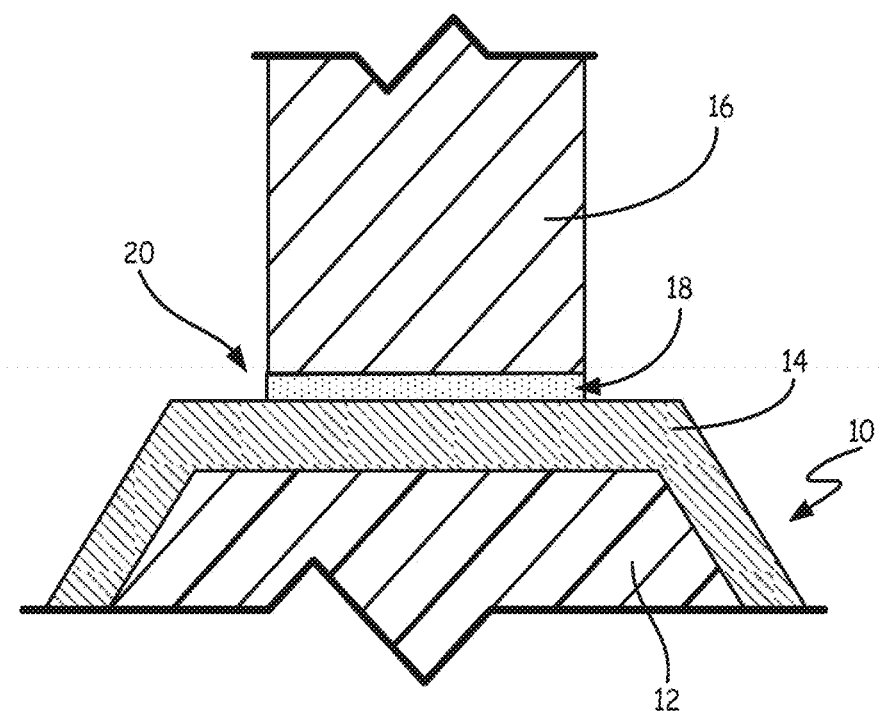
FIG. 1 is a schematic showing a plated polymer component and a metal substrate prior to TLP bonding.

FIG. 1 is a schematic view showing a plated polymer component and a metal substrate prior to TLP bonding. Plated polymer component 10 includes a non-metallic core 12 and metal layer 14. In some embodiments, non-metallic core 12 is formed from a thermoplastic and/or thermoset material, forming a polymer component. Suitable thermoplastic and thermoset materials for non-metallic core 12 include, but are not limited to, polyphenylene sulfides, polyamides, polyvinylchloride (PVC), polystyrene (PS), polyethylene (PE), polypropylene (PP), styrene-acrylonitrile (SAN), polycarbonate (PC), acrylonitrile styrene acrylate (ASA), acrylonitrile butadiene styrene (ABS), ethylene tetrafluoroethylene fluoropolymer (ETFE), high impact polystyrene (HIPS), polyamide (PA), polybutylene terephthalate (PBT), polyetherimide (PEI), perchloroethylene (PCE), polyether sulfone (PES), polyethylene terephthalate (PET), polysulfone (PSU), polyurethane (PUR), polyvinylidene fluoride (PVDF), polyether ether ketone (PEEK), polyetherimide (PEI), thermoplastic polyimide, condensation polyimide, addition polyimide, polyether ketone ketone (PEKK), polysulfone, polyphenylsulfide, polyester, epoxy cured with aliphatic and/or aromatic amines and/or anhydrides, cyanate esters, phenolics, polyacrylates, polymethacrylates, silicones (thermoset), any of the foregoing with fiber reinforcement (e.g., carbon-fiber or glass-fiber) and combinations thereof.

In some embodiments, non-metallic core 12 is solid. In other embodiments, non-metallic core 12 is a hollow body. In some embodiments, non-metallic core 12 has an average wall thickness between about 1.27 mm (0.050 inches) and about 12.7 mm (0.500 inches). Non-metallic core 12 can be formed by injection molding, resin transfer molding, vacuum-assisted resin transfer molding, composite layup (autoclave, compression, or liquid molding), compression molding, extrusion, thermoforming, weaving (2D or 3D), braiding, vacuum-forming, machining, laminating, additive manufacturing (liquid bed, powder bed, deposition processes), and other manufacturing techniques.

Metal layer 14 is formed over at least a portion of non-metallic core 12 and joined to non-metallic core 12. Metal layer 14 can be formed from any metal having a melting temperature above about 150° C. (302° F.). In some embodiments, metal layer 14 contains nickel, cobalt, iron, gold, silver, and copper, alloys of nickel, cobalt, iron, gold, silver, and copper, and combinations thereof. Metal layer 14 can be formed on and joined to non-metallic core 12 by electroplating, electroless plating, electroforming, spray coating, physical vapor deposition, or any other metal deposition method capable of joining metal layer to non-metallic core 12. In some embodiments, metallic layer 14 has a thickness between about 0.0254 mm (0.001 inches) and about 2.54 mm (0.100 inches).

Together, non-metallic core 12 and metal layer 14 make up plated polymer component 10. Plated polymer component 10 can be any of a number of gas turbine engine components. Suitable components include spinners/nose cones, airfoils, tubes, connectors, covers, ducts, platforms, cases, nacelle components, cascade reversers, brackets, struts, tubes, FADECs, and housings.

FIG. 1 also illustrates metal substrate 16. Metal substrate 16 can be formed from any metal having a melting temperature above about 150° C. (302° F.). In some embodiments, metal substrate 16 contains nickel, cobalt, iron, gold, silver, and copper, alloys of nickel, cobalt, iron, gold, silver, and copper, and combinations thereof. In some embodiments, metal substrate 16 is a structural component to which plated polymer component 10 will be bonded. In some particular embodiments, metal substrate 16 is a rib, boss or flange. Metal substrate 16 can also be a metal-plated polymer component as described above.

FIG. 1 further illustrates interlayer 18. As described in greater detail below, interlayer 18 is used to TLP bond plated polymer component 10 to metal substrate 16. Interlayer 18 is located in bond region 20 between metal substrate 16 and metal layer 14 of plated polymer component 10. Interlayer 18 can be composed of a single element, an alloy or a multi-layer combination of elements and/or alloys. In some embodiments, interlayer 18 includes elements selected from the group consisting of gallium, indium, selenium, tin, bismuth, iodine, polonium, cadmium, and combinations thereof. In some embodiments, interlayer 18 includes other components in addition to the elements listed above. In these cases, interlayer 18 generally includes at least 50% of gallium, indium, selenium, tin, bismuth, iodine, polonium, cadmium, and combinations thereof by weight. In some embodiments, interlayer 18 has a thickness between about 0.00127 mm (0.00005 inches) and about 1.27 mm (0.050 inches).

Figure 2A:
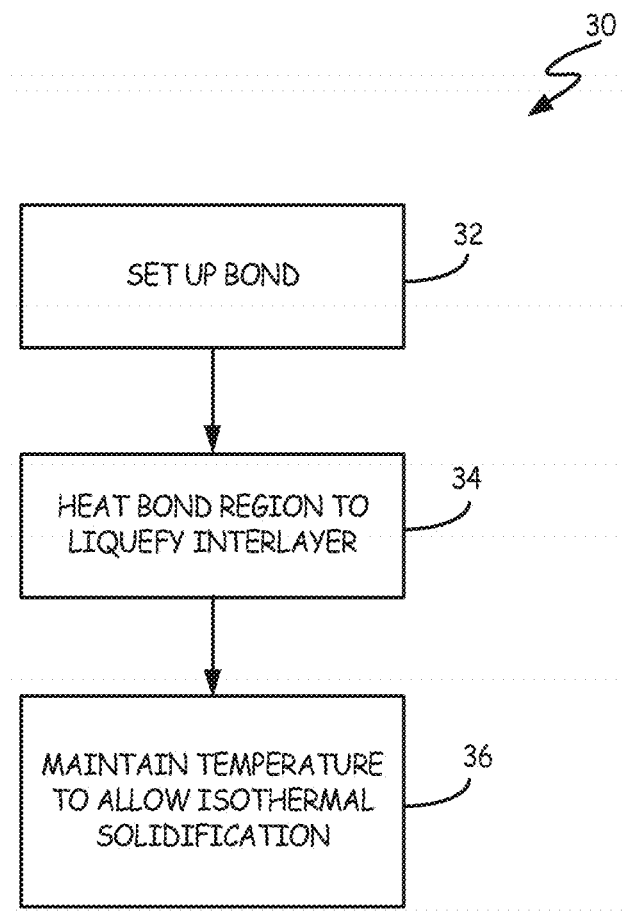
FIG. 2A is a block diagram showing one embodiment of a TLP bonding method.

FIG. 2A is a block diagram showing the steps of one embodiment of a TLP bonding method for bonding a plated polymer component to a metal substrate. According to FIG. 2A, TLP bonding method 30 includes setting up the bond (step 32), heating the bond region to liquefy the interlayer (step 34) and maintaining the bond region at the bonding temperature to allow isothermal solidification of the bond (step 36).

In step 32, the bond is set up. Polymer component 10 and metal substrate 16 are positioned adjacent one another at bond region 20 as shown in FIG. 1. Interlayer 18 is positioned between metal layer 14 of polymer component 10 and metal substrate 16. Depending on its form, interlayer 18 can be positioned at bond region 20 in different ways. In some embodiments, interlayer 18 is a thin foil, a powder, a powder compact or a paste. In these embodiments, interlayer 18 is typically positioned, spread or brushed on either metal layer 14 or metal substrate 16. In other embodiments, interlayer 18 is deposited on either metal layer 14 or metal substrate 16 by physical vapor deposition, sputtering, electroplating, electroforming or applying interlayer 18 as a solution and vaporizing the solvent.

Once interlayer 18 has been positioned between metal layer 14 and metal substrate 16, metal layer 14, metal substrate 16 and interlayer 18 are held in place at bond region 20. In some embodiments, pressure is applied to bond region 20 to maintain alignment of polymer component 10 and metal substrate 16 and promote bonding. In some embodiments, a fixture is used to maintain alignment of polymer component 10 and metal substrate 16 (the bond can be formed with little or no pressure).

Once the bond has been set up in step 32, bond region 20 is heated to liquefy interlayer 18 in step 34. Bond region 20 can be heated using radiation (visible or infrared), conduction, induction, resistance heating or a laser. Depending on the type of metal layer 14, metal substrate 16 and interlayer 18 chosen, step 34 (and subsequent steps) can be carried out under vacuum conditions, in an inert atmosphere or ambient atmospheric conditions. Inert atmospheres include, but are not limited to, argon, nitrogen, hydrogen and a mixture of nitrogen and hydrogen.

Bond region 20 is heated to a bonding temperature greater than or equal to either (1) the melting temperature of interlayer 18 or (2) the minimum eutectic reaction temperature between interlayer 18 and (a) metal layer 14 or (b) metal substrate 16. The melting temperature of interlayer 18 depends on the particular makeup of interlayer 18. In some embodiments, the bonding temperature used in step 34 is substantially equal to the melting temperature (direct or eutectic) of interlayer 18. In other embodiments, the bonding temperature is between about 11.1° C. (20° F.) and about 33.3° C. (60° F.) greater than the melting temperature of interlayer 18. Once the melting point of interlayer 18 is reached, interlayer 18 begins to liquefy. Typically, the bonding temperature is greater than the melting point of interlayer 18 to ensure complete melting of interlayer 18 and to increase the rate at which interlayer 18 diffuses into metal layer 14 and metal substrate 16 at bond region 20.

At the bonding temperature, liquefied interlayer 18 dissolves (or "melts back") metal layer 14 and metal substrate 16 at bond region 20. Once interlayer 18 has been completely liquefied, the temperature at bond region 20 is maintained at the bonding temperature to allow isothermal solidification of the bond. At the bonding temperature, interlayer 18 diffuses into metal layer 14 and metal substrate 16 at bond region 20. In step 36, bond region 20 is kept at the bonding temperature while this diffusion occurs. Because the diffusion occurs isothermally, the liquid region of interlayer 18 contracts to maintain equilibrium and interlayer 18 solidifies with metal layer 14 and metal substrate 16 at bond region 20. Once interlayer 18 has isothermally solidified, the TLP bond is complete.

Figure 2B:
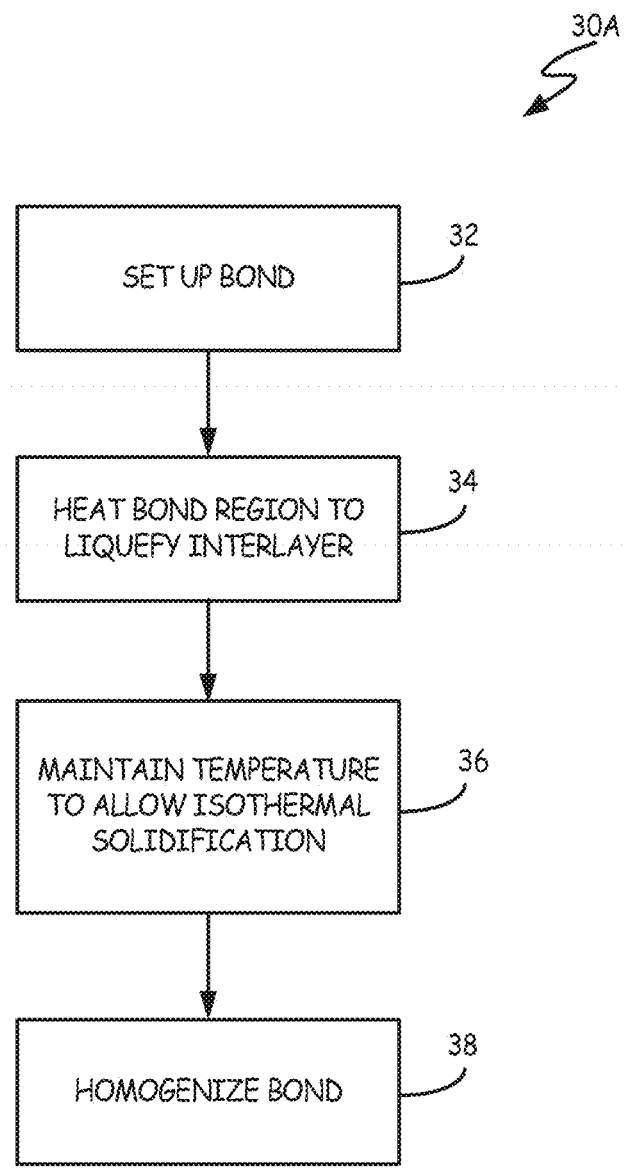
FIG. 2B is a block diagram showing another embodiment of a TLP bonding method.

In some embodiments, the bond formed in steps 32, 34 and 36 is further homogenized as shown in FIG. 2B. Method 30A includes homogenization step 38 following isothermal solidification step 36. Homogenization increases the melting temperature of the resulting bond formed at bond region 20. Homogenization step 38 includes heating bond region 20. Homogenization can be performed at or near the bonding temperature used in steps 34 and 36 or at a temperature lower than the bonding temperature. Homogenization can be performed immediately after step 36, where bond region 20 is held at an elevated temperature for an extended time. Alternatively, homogenization can be performed at a later time as a post-bonding treatment. After homogenization, the resulting bond formed at bond region 20 between metal layer 14 and metal substrate 16 can have a remelting temperature hundreds of degrees Celsius above the initial melting temperature of interlayer 18.

Figure 3:
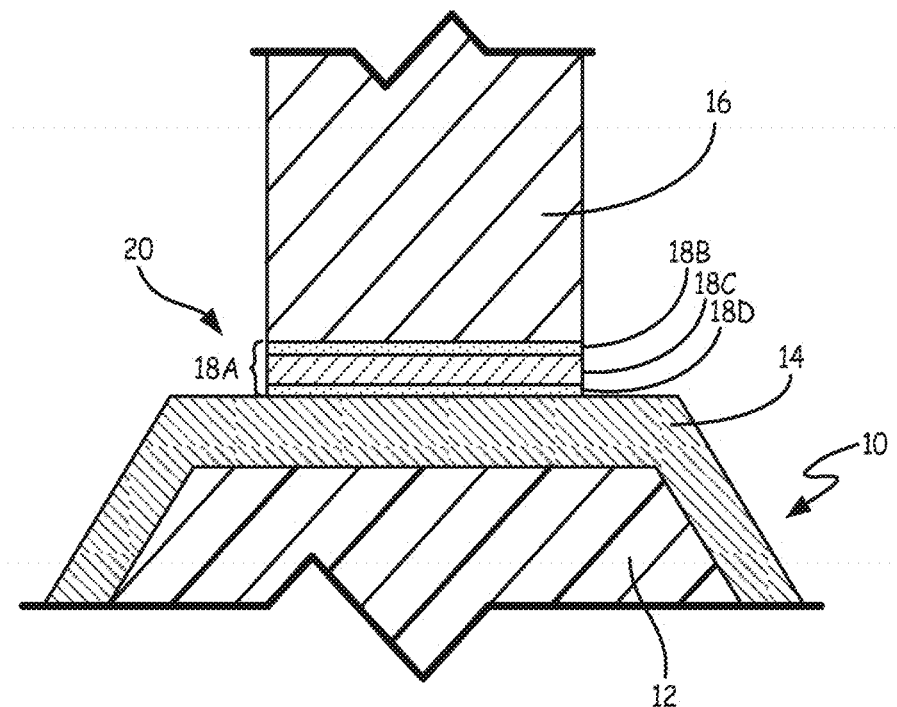
FIG. 3 is a schematic showing a plated polymer component and a metal substrate prior to PTLP bonding.

Partial transient liquid phase (PTLP) bonding is a variant of TLP bonding that is typically used to join ceramics. PTLP bonding can also be used to join metal layer 14 and metal substrate 16. PTLP requires an interlayer composed of multiple layers. In some embodiments, PTLP is performed using an interlayer having a relatively thick refractory core sandwiched by thin, lower-melting layers on each side. FIG. 3 is a schematic view showing a plated polymer component and a metal substrate prior to PTLP bonding including interlayer 18A having first layer 18B, second (middle) layer 18C and third layer 18D. FIG. 3 is not drawn to scale in order to show the distinct layers of interlayer 18A. In some embodiments, middle layer 18C of interlayer 18A used in PTLP bonding includes elements selected from the group consisting of refractory metals nickel, iron, cobalt, gold, magnesium, silver, copper, antimony, manganese, palladium, strontium, tellurium, ytterbium, aluminum, calcium, europium, gadolinium, germanium, platinum, rhodium, thulium, vanadium and combinations thereof and has a thickness between about 0.00254 mm (0.0001 inches) and about 1.27 mm (0.050 inches). In some embodiments, interlayer 18 includes other components in addition to the elements listed above. In these cases, interlayer 18 generally includes at least 50% of nickel, iron, cobalt, gold, magnesium, silver, copper, antimony, manganese, palladium, strontium, tellurium, ytterbium, aluminum, calcium, europium, gadolinium, germanium, platinum, rhodium, thulium, vanadium, and combinations thereof by weight. In some embodiments, the thinner outer layers (18B and 18D) of interlayer 18 include elements selected from the group consisting of gallium, indium, selenium, tin, bismuth, iodine, polonium, cadmium, and combinations thereof, and have thicknesses between about 0.2% and about 20% of the thickness of middle layer 18C. In some embodiments, interlayer 18 includes other components in addition to the elements listed above. In these cases, interlayer 18 generally includes at least 50% of gallium, indium, selenium, tin, bismuth, iodine, polonium, cadmium, and combinations thereof by weight. PTLP bonding is performed as described above with respect to TLP bonding. In the case of PTLP bonding, different bonding temperatures can be utilized and the rate at which interlayer 18A melts and diffuses may differ due to the multi-layer nature of interlayer 18A.

Figure 4:
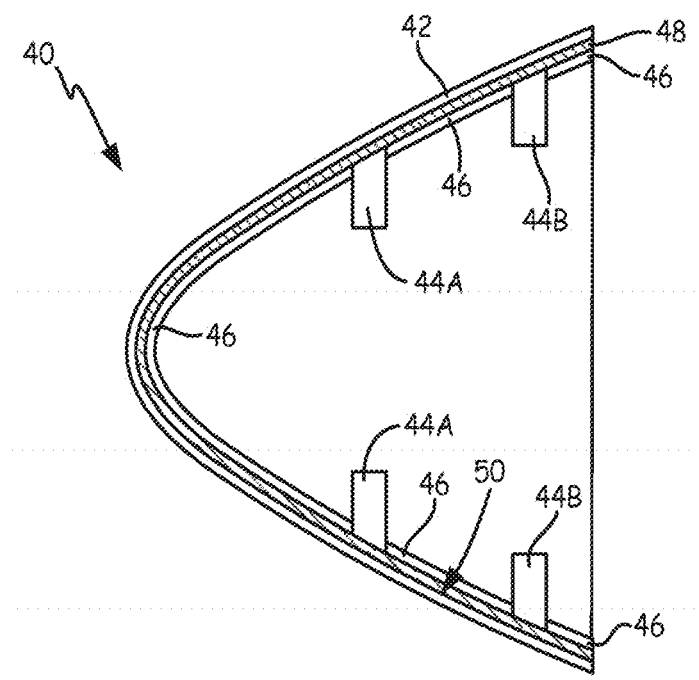
FIG. 4 is a cross section view of a nosecone and its internal ribbing connected by TLP bonding.

FIG. 4 illustrates one example of TLP or PTLP bonding between a plated polymer component and a metal substrate. FIG. 4 is a cross-section view of a nosecone and its internal ribs. In one embodiment, nosecone 40 is a metal-plated polymer component having a polymer or composite core and a metal layer covering the core. As shown in FIG. 4, nosecone 40 includes outer shell 42. Circular ribs 44A and 44B and axial ribs 46 are structures that provide support to nosecone 40. In one embodiment, one or more of circular ribs 44A and 44B and axial ribs 46 are metal-plated polymers. Bonding interlayer 48 is positioned between outer shell 42 and circular ribs 44A and 44B and axial ribs 46, and can be a single layer or a multi-layer interlayer to produce a TLP or PTLP bond, respectively, as described above. FIG. 4 is not drawn to scale to better illustrate the layers of the cross-section view of nosecone 40. Circular ribs 44A and 44B and axial ribs 46 are TLP or PTLP bonded to inner surface 50 of nosecone 40 and the external surfaces of ribs 44A, 44B, and 46 as described above with respect to FIGS. 2A and 2B. In another embodiment, one or more of circular ribs 44A and 44B and axial ribs 46 are Ni-based alloys.

Figure 5:
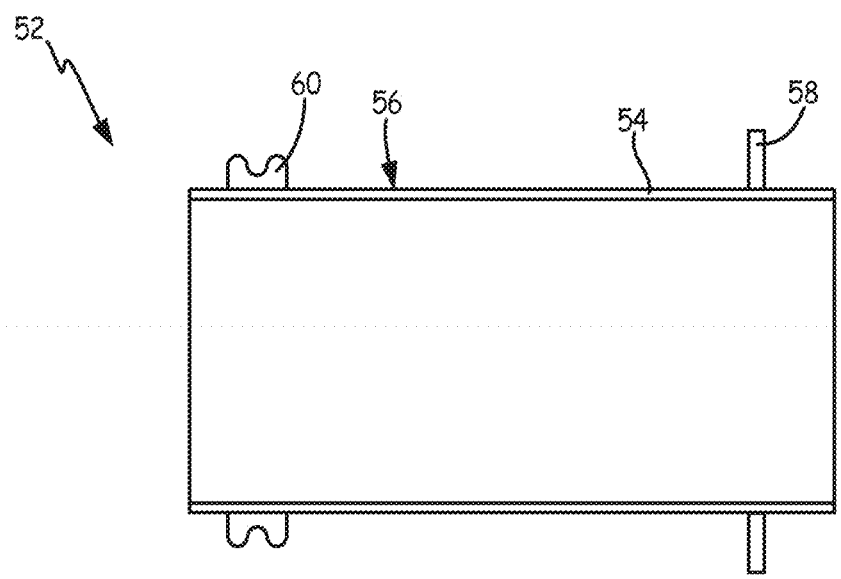
FIG. 5 is a cross section view of a tube having a flange joined by TLP bonding and an O-ring channel joined by TLP bonding.

FIG. 5 illustrates another example of TLP bonding between a plated polymer component and a metal substrate. FIG. 5 is a cross-section view of a tube having a flange joined to the tube by TLP or PTLP bonding and an O-ring channel joined to the tube by TLP or PTLP bonding. Tube 52 is generally cylindrical and includes wall 54 having outer surface 56. In some embodiments, tube 52 is a metal-plated polymer component having a polymer or composite core and a metal layer at outer surface 56. In other embodiments, outer surface 56 is metallic. Attached to tube 56 along outer surface 56 are flange 58 and O-ring channel 60. Flange 58 and O-ring channel 60 are metal-plated polymer components or have an outer metallic surface and are TLP or PTLP bonded to outer surface 56 of tube 52 as described above with respect to FIGS. 2A and 2B. TLP and PTLP bonding allows the formation of a typical component using easily molded or machined parts. While FIGS. 4 and 5 illustrate just two particular embodiments of metal-plated polymer components or features that are TLP bonded to other structures, many other examples are possible such as ducts, covers, brackets, clamps, bosses, flanges, ribs, and channels.

TLP bonding allows plated polymer components to be bonded to metal components without deforming or destroying the polymer core of the plated polymer. TLP bonding provides a strong bond that can be used above the bonding temperature and TLP bonded parts do not possess the disadvantages and limitations of conventional hardware and assembly devices such as bolts and rivets.

Transient Liquid Phase Bonded Alloyed Surface Coatings

Figure 6:
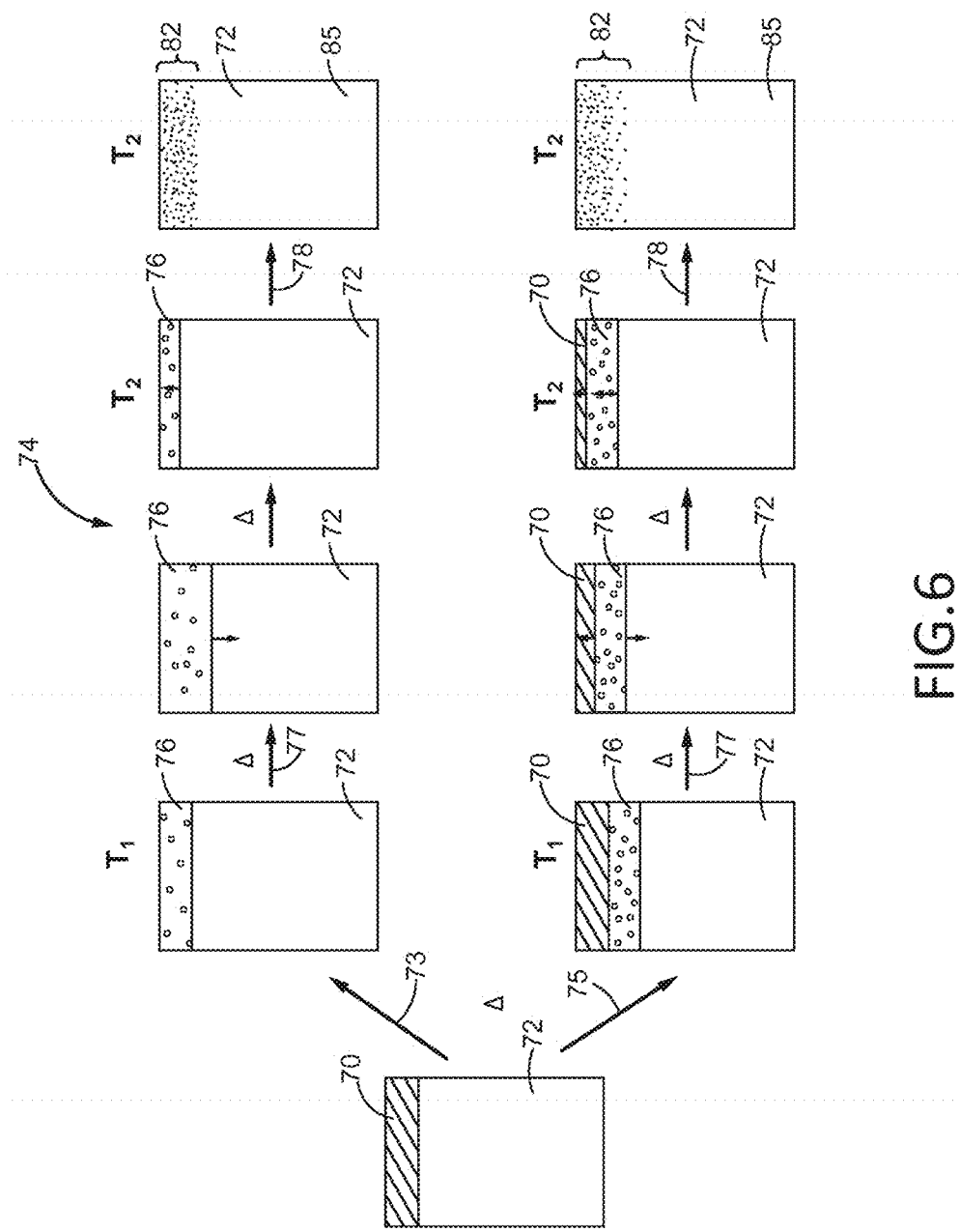
FIG. 6 is a schematic representation illustrating a transient liquid phase (TLP) bonding process for forming a bond between a substrate and a coating in accordance with the present disclosure.

Turning now to FIG. 6, the bonding of a first coating 70 to a substrate 72 by a TLP bonding process 74 is depicted. The first coating 70 may consist of any metallic material and it may be applied by any suitable method apparent to those of ordinary skill in the art. Such methods may include, but are not limited to, chemical vapor deposition, physical vapor deposition, plating, cold spraying, or plasma spraying. The substrate 72 may be any metallic structure, such as, but not limited to, a pure metal, an alloy, an intermetallic, or a metal matrix composite. The first coating 70 may be applied to one or more surfaces of the substrate 72 and it may be capable of imparting the substrate 72 with one or more properties favorable to its operation and use, such as, but not limited to, enhanced hardness, wear resistance, oxidation resistance, thermal conductivity, and/or electrical conductivity. The first coating 70 may have a thickness from less than about one (1) micron (about 0.001 mm) to up to about 500 microns (about 0.5 mm).

Following the application of the first coating 70 to one or more exterior surfaces of the substrate 72, the coated substrate may be progressively heated (symbolized by A) to a bonding temperature ($T_2$) which is selected based on the composition of the first coating 70. Upon reaching a suitable temperature ($T_1$) during the heating process, and prior to reaching the bonding temperature ($T_2$), a liquid interlayer 76 may form at the interface between the coating 70 and the substrate 72 by either direct melting 73 of the first coating 70 or by eutectic melting 75 between the first coating 70 and the substrate 72, as shown in FIG. 6. Direct melting 73 of the first coating 70 may result if the first coating 70 is heated beyond its melting point such that the entire first coating 70 liquefies and forms the interlayer 76. In contrast, eutectic melting 75 of the first coating 70 may result if the substrate 72 and the first coating 70 form a eutectic product at the interface of the first coating 70 and the substrate 72 and the eutectic product has a melting temperature lower than the melting temperatures of the first coating 70 and the substrate 72. Accordingly, the interlayer 76 formed by eutectic melting 75 may be a thin liquid layer located between the substrate 72 and an un-melted layer of the first coating 70, as shown in FIG. 1. With continued heating past $T_1$, dissolution may occur in which the solid-liquid boundaries of the interlayer 76 may expand and dissolve some of the material of the substrate 72 (and an un-melted layer of the first coating 70, if present), as shown. During this dissolution/expansion process 77, the interlayer 76 may expand up to several times its original thickness.

Upon reaching the bonding temperature ($T_2$), the liquid interlayer 76 may diffuse into the substrate 72 and undergo an isothermal solidification process 78 until all of the liquid of the interlayer 76 has solidified and a custom coating 82 is formed at the outer surface of the substrate 72. For the case of eutectic melting, the liquid of the interlayer 76 migrates towards the surface by solidifying at the interface with substrate 72 and liquefying material at the interface with the first coating 70. This process continues until the first coating 70 is completely consumed and solidification of interlayer 76 proceeds as described previously to yield the custom coating 82, as shown. At this stage, the custom coating process may be terminated. The custom coating 82 may compositionally resemble a gradient of the first coating 70 material in the substrate 72 material and may have a smooth transition of grain boundaries and properties between the outer surface and the substrate 72. Alternatively, the custom coating 82 may be diffused in with continued heating to form different gradients having increasing proportions of the substrate 72 with increased heating. In any event, whether the custom coating 82 undergoes homogenization after the TLP bonding process or not, the completion of the TLP bonding process 74 will provide a part 85 having a custom coating 82 with a functionally graded structure having microstructural, mechanical, and physical properties different than those of the substrate 72 and the first coating 70. For example, if the substrate 72 is formed from nickel and the first coating 70 is formed from aluminum, the custom coating 82 may have properties of an intermetallic material composed of nickel and aluminum. In addition, the custom coating 82 may have a melting temperature that exceeds the bonding temperature ($T_2$) used to join the substrate 72 and the first coating 70 and may therefore exhibit enhanced thermal stability.

Figure 7:
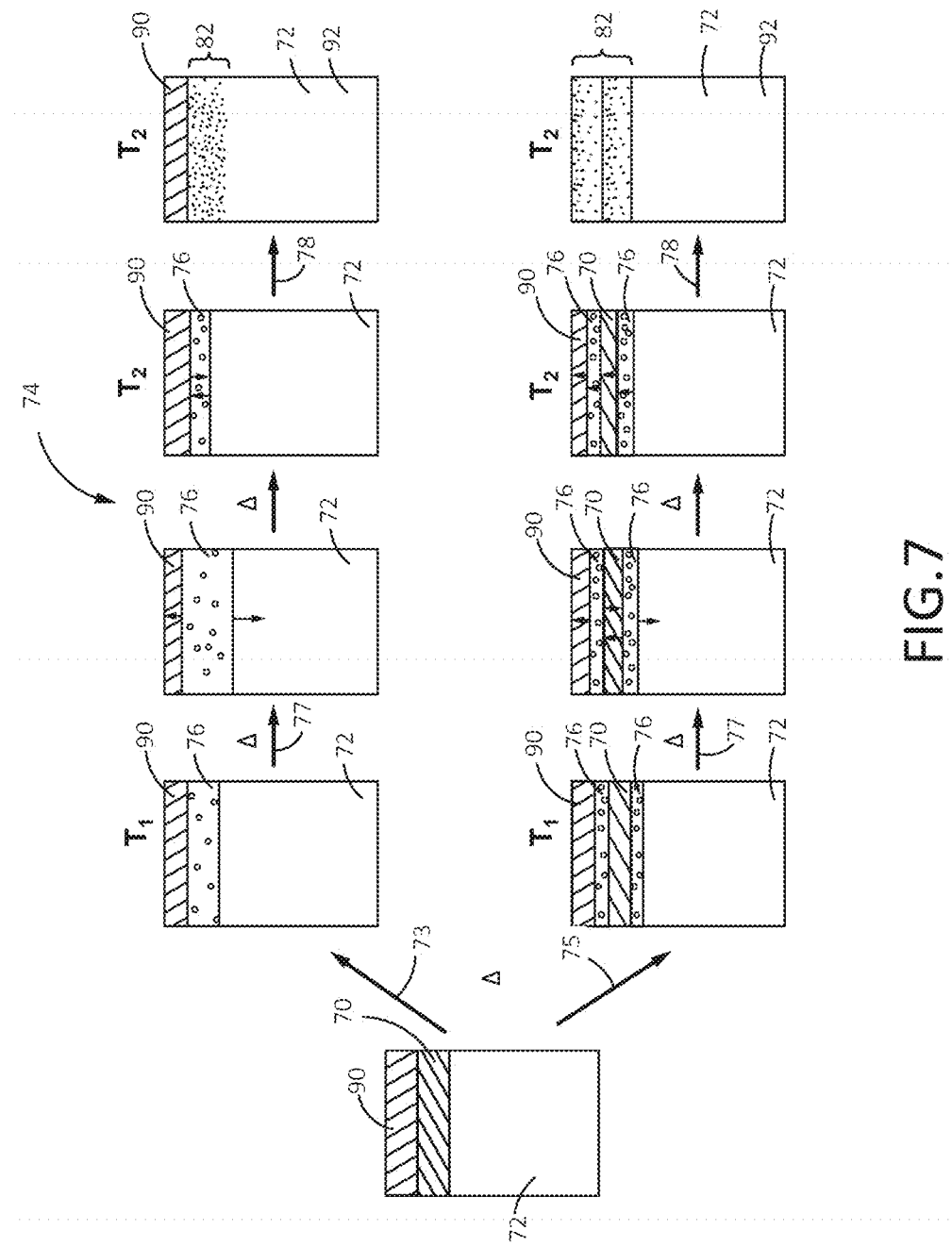
FIG. 7 is a schematic representation illustrating the TLP bonding process for forming a bond between the substrate and two coatings in accordance with the present disclosure.

The bonding of multiple coatings (a first coating 70 and a second coating 90) to the outer surface of the substrate 72 by the TLP bonding process 74 is depicted in FIG. 7. The second coating 90 may be a metallic coating which differs in composition from the first coating 70 and may impart one or more selected properties to the substrate 72 which may differ from the properties provided by the first coating 70. The first coating 70 and the second coating 90 may be deposited sequentially on one or more surfaces of the substrate 72 by any deposition method apparent to those of ordinary skill in the art (e.g., chemical vapor deposition, physical vapor deposition, plating, cold spraying, plasma spraying, etc.). The second coating 90 may also have a thickness from less than about one (1) micron (about 0.001 mm) to up to about 500 microns (about 0.5 mm). The coated substrate may then be progressively heated (symbolized by A) to a bonding temperature ($T_2$), as shown. Upon reaching a suitable temperature ($T_1$) during the heating process, melting of all of the first coating 70 may occur by direct melting 73 to form an interlayer 76 between the second coating 90 and the substrate 72. Alternatively, if a eutectic product is formed between the substrate 72 and the first coating 70 and/or between the first coating 70 and the second coating 90, the eutectic product may melt by eutectic melting 75 to form a thin interlayer 76 between the substrate 72 and the first coating 70 and/or between the first coating 70 and the second coating 90, as shown.

With continued heating above $T_1$ and prior to reaching the bonding temperature $T_2$, the interlayer(s) 76 may expand in thickness by a dissolution/expansion process 77, as explained above. Once the bonding temperature $T_2$ is reached, the interlayer(s) 76 may diffuse and isothermally solidify into the substrate 72 (and any solid portions of the first coating 70 and second coating 90) to form a custom coating 82 between the substrate 72 and the first coating 70. In this way, a multi-layered custom coating may also be formed of the first coating 70 and the second coating 90 as the liquid interfaces migrate towards the surface, as described above. If the TLP process is ceased after completion of the isothermal solidification 78, the custom coating 82 may be a gradient of the composition of the substrate 72 and the first coating 70 and may have microstructural and physical properties between those of the substrate 72 and the first coating 70. Similarly, if a custom coating is formed between the first coating 70 and the second coating 90, it may compositionally resemble a gradient of the first coating 70 and the second coating 90 and have microstructural and physical properties resembling both coatings. Homogenization of the custom coating 82 may be achieved, if desired, with further heating as described above. The resulting part 92 may exhibit any advantageous properties provided by the first coating 70 and/or the second coating 90. In this way, multiple coatings may be bonded to one or more surfaces of the substrate 72 and one may select and combine coatings according to desired combinations of physical properties. In addition to the embodiments described above, more than two coatings can be utilized to further enhance the custom coatings that can be produced by TLP bonding in this manner. Furthermore, one or more coatings may be utilized in different sections of the component to produce locally customized coatings.

Figure 8:
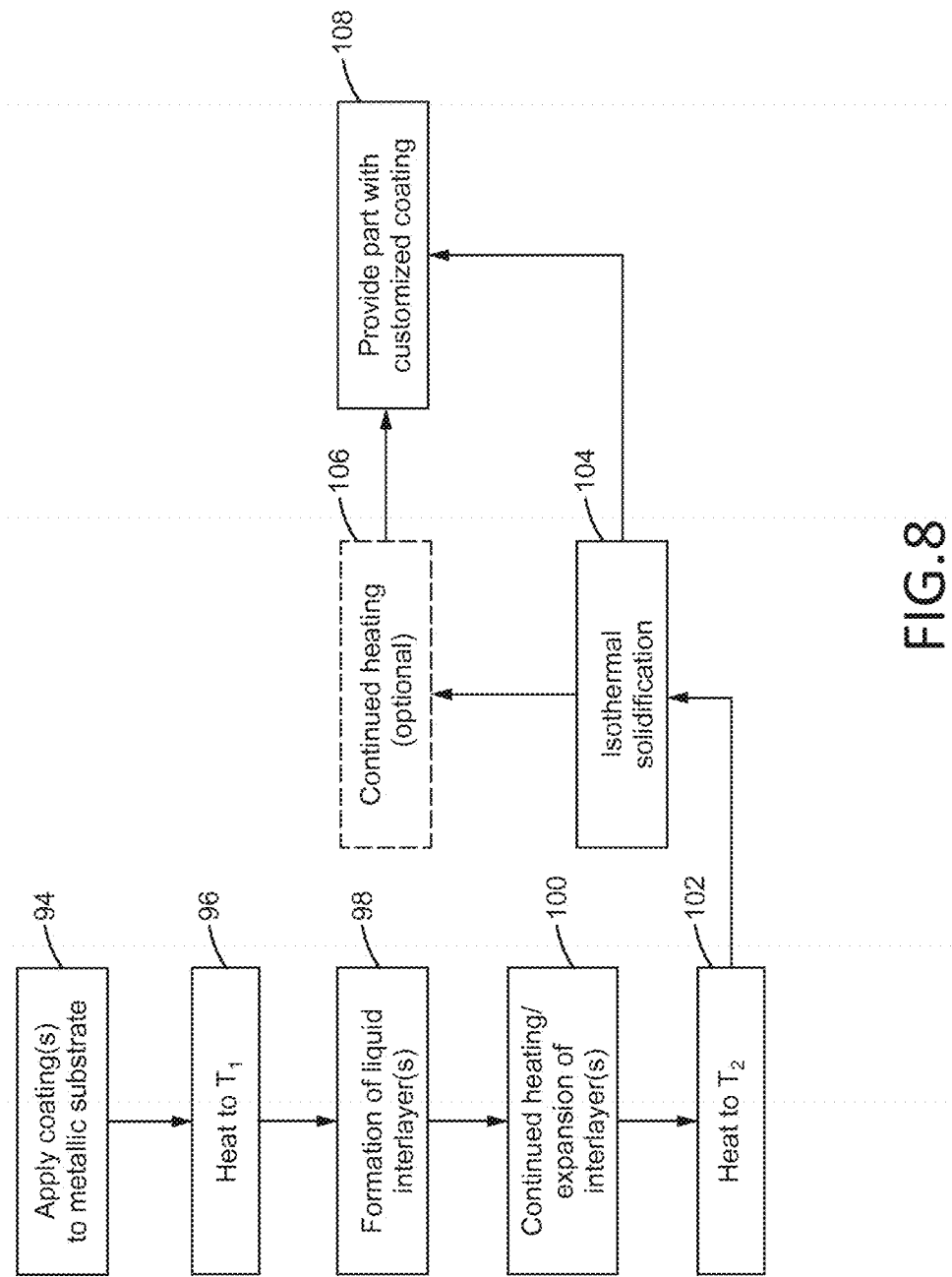
FIG. 8 is a block diagram illustrating the steps involved in bonding the substrate to one or more coatings by the TLP bonding process, in accordance with a method of the present disclosure.

FIG. 8 illustrates steps which may be involved in bonding one or more metallic coatings to one or more exterior surfaces of the substrate 72 by the TLP bonding process 74. According to a first block 94, one or more coatings (such as the first coating 70) may be applied to one or more surfaces of the substrate 72 by any conventional deposition process selected by a skilled artisan. The coated substrate may then be heated to a first temperature ($T_1$) which may cause a liquid interlayer 76 to form between the surface of the substrate 72 and the coating by direct or eutectic melting according to a block 96 and a block 98, as shown. In this way, interlayer(s) 76 may also be formed between each of the coatings as illustrated in FIG. 7. According to a next block 100, the coated substrate may be further heated past $T_1$ which causes expansion of the liquid interlayer(s) 76. Further heating of the coated substrate to the bonding temperature ($T_2$) may cause the diffusion and isothermal solidification of the interlayer(s) 76 into the substrate 72 (and adjacent coatings which remain in a solid state) according to a block 102 and a block 104, as shown. At this stage, the customized coating 82 may be formed between the substrate 72 and the coating(s), and the customized coating 82 may have microstructural and physical properties between those of the substrate 72 and the coating(s) (block 106). To further homogenize the customized coating 82, optional continued heating may be employed according to a block 106. The part having a customized coating 82 bonded to the substrate 72 may then be provided according to a block 108, as shown.

From the foregoing, it can therefore be seen that TLP bonding of one or more metallic coatings to metallic substrates can find applicability in many situations, including, but not limited to, the production of metallic components having specialized or customized coatings. The TLP bonding process forms a strong bond or joint between the metallic substrate and the coating(s) which has microstructural and physical properties between those of the substrate and the coating materials. Moreover, one may select and combine coatings having varying desirable properties to form specialized coatings by the TLP bonding process. Although some conventional coating methods for metals (e.g., cold spraying) may provide a mechanical interlock between the metallic substrate and the coating, TLP bonding may provide a more robust and thermally stable bond between the substrate and coating. More specifically, the resulting bond between the metallic substrate and the coating may have a melting temperature in excess of the bonding temperature used for TLP bonding, such that the formed bond may operate at temperatures well above the bonding temperature. This feature may be advantageous, for example, when joining temperature-sensitive materials whose micro-structures could be damaged by too much thermal energy input. It is expected that the technology as disclosed herein may find wide industrial applicability for component fabrication in various industries including, but not limited to, aerospace and automotive industries.

What is claimed:

1. A method of bonding components, the method comprising:
positioning an interlayer between a metallic component and a metal-plated polymer component at a bond region, wherein the interlayer comprises an element selected from the group consisting of gallium, indium, selenium, tin, bismuth, iodine, polonium, cadmium, and combinations thereof;
heating the bond region to a bonding temperature to produce a liquid at the bond region; and
maintaining the bond region at the bonding temperature until the liquid produced at the bond region has solidified to form a bond between the metallic component and the metal-plated polymer component at the bond region.

2. The method of claim 1, further comprising:
homogenizing the bond.

3. The method of claim 1, wherein the metallic component is selected from the group consisting of metal-plated polymers and metal-plated composites.

4. The method of claim 1, wherein one of the metallic component and the metal-plated polymer component is selected from the group consisting of ribs, bosses, flanges, channels, clamps, covers, ducts and brackets.

5. The method of claim 1, wherein the interlayer comprises:
a first layer having a first thickness;
a second layer adjacent the first layer and having a second thickness greater than the first; and
a third layer adjacent the second layer on a side generally opposite the first layer.

6. The method of claim 5, wherein the first layer comprises an element selected from the group consisting of gallium, indium, selenium, tin, bismuth, iodine, polonium, cadmium, and combinations thereof.

7. The method of claim 5, wherein the second layer comprises an element selected from the group consisting of refractory metals, nickel, iron, cobalt, gold, magnesium, silver, copper, antimony, manganese, palladium, strontium, tellurium, ytterbium, aluminum, calcium, europium, gadolinium, germanium, platinum, rhodium, thulium, vanadium and combinations thereof.

8. The method of claim 5, wherein the third layer comprises an element selected from the group consisting of gallium, indium, selenium, tin, bismuth, iodine, polonium, cadmium, and combinations thereof.

9. The method of claim 1, wherein the metal-plated polymer component comprises:
a polymer component comprising a polymer selected from the group consisting of polyphenylene sulfides, polyamides, polyvinylchloride (PVC), polystyrene (PS), polyethylene (PE), polypropylene (PP), styrene-acrylonitrile (SAN), polycarbonate (PC), acrylonitrile styrene acrylate (ASA), acrylonitrile butadiene styrene (ABS), ethylene tetrafluoroethylene fluoropolymer (ETFE), high impact polystyrene (HIPS), polyamide (PA), polybutylene terephthalate (PBT), polyetherimide (PEI), perchloroethylene (PCE), polyether sulfone (PES), polyethylene terephthalate (PET), polysulfone (PSU), polyurethane (PUR), polyvinylidene fluoride (PVDF), polyether ether ketone (PEEK), polyethermide (PEI), thermoplastic polyimide, condensation polyimide, addition polyimide, polyether ketone ketone (PEKK), polysulfone, polyphenylsuilfide, polyester, epoxy cured with aliphatic and/or aromatic amines and/or anhydrides, cyanate esters, phenolics, polyacrylates, polymethacrylates, silicones (thermoset), and combinations thereof; and
a metallic layer covering at least a portion of the polymer component such that the metallic layer is located at the bond region.

10. The method of claim 1, wherein the metal-plated polymer component is a metal-plated composite comprising:
a polymer composite component; and
a metallic layer covering at least a portion of the composite component such that the metallic layer is located at the bond region.

* * * * *